US012187305B2

(12) United States Patent
Frey et al.

(10) Patent No.: US 12,187,305 B2
(45) Date of Patent: Jan. 7, 2025

(54) POWERTRAIN TORQUE CONTROL DURING SHIFT TO FOUR-WHEEL DRIVE IN AUTOMATED-DRIVING MODE

(71) Applicant: FORD GLOBAL TECHNOLOGIES, LLC, Dearborn, MI (US)

(72) Inventors: Michael Frey, Farmington Hills, MI (US); Filip Tomik, Milford, MI (US); Richard David Bruns, Milford, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 217 days.

(21) Appl. No.: 17/835,733

(22) Filed: Jun. 8, 2022

(65) Prior Publication Data

US 2023/0399003 A1 Dec. 14, 2023

(51) Int. Cl.
*B60W 50/12* (2012.01)
*B60W 50/08* (2020.01)

(52) U.S. Cl.
CPC .......... *B60W 50/12* (2013.01); *B60W 50/082* (2013.01); *B60W 2510/0208* (2013.01); *B60W 2510/0275* (2013.01)

(58) Field of Classification Search
CPC ............... B60W 50/12; B60W 50/082; B60W 2510/0208; B60W 2510/0275; B60K 2023/085; B60K 23/08; B60K 5/02; B60K 2023/0825; B60Y 2400/421
See application file for complete search history.

(56) References Cited

U.S. PATENT DOCUMENTS

| 5,562,567 | A | 10/1996 | Koenig et al. | |
|---|---|---|---|---|
| 5,993,354 | A | 11/1999 | Winks | |
| 10,870,423 | B1* | 12/2020 | Orzechowski | B60T 8/173 |
| 11,230,288 | B1* | 1/2022 | Tokarz | B60W 20/40 |
| 2007/0039770 | A1 | 2/2007 | Barrette et al. | |
| 2014/0135168 | A1* | 5/2014 | Yokoo | B60K 23/08 477/8 |
| 2017/0166052 | A1* | 6/2017 | Ogawa | B60K 17/344 |
| 2017/0182887 | A1* | 6/2017 | Ogawa | B60K 17/344 |
| 2018/0134153 | A1* | 5/2018 | Kumar | F16H 48/08 |
| 2020/0001712 | A1* | 1/2020 | Chirco | B60K 17/344 |
| 2021/0033183 | A1* | 2/2021 | Dumas | F16H 48/34 |
| 2021/0203573 | A1* | 7/2021 | Miura | H04L 67/12 |
| 2022/0227349 | A1* | 7/2022 | Aratake | B60W 20/14 |

(Continued)

FOREIGN PATENT DOCUMENTS

| CN | 105370876 A | 3/2016 |
|---|---|---|
| WO | 2015087159 A1 | 6/2015 |

*Primary Examiner* — Sze-Hon Kong
(74) *Attorney, Agent, or Firm* — Vincent Mastrogiacomo; Brooks Kushman P.C.

(57) ABSTRACT

A vehicle includes a primary axle, a secondary axle, and a powertrain. The powertrain has an engine coupled to the primary axle and selectively coupled to the secondary axle. The vehicle also includes a clutch associated with the secondary axle. A controller is programmed to, responsive to (i) a request to shift from two-wheel drive to four-wheel drive and (ii) a current engine-torque command exceeding a torque limit associated with the clutch, override the current engine-torque command to reduce a torque of the engine below the torque limit, and, responsive to the torque of the engine being less the torque limit, command engagement of the clutch.

20 Claims, 3 Drawing Sheets

(56) References Cited

U.S. PATENT DOCUMENTS

| | | | | |
|---|---|---|---|---|
| 2022/0379714 | A1* | 12/2022 | Tabata | B60W 10/06 |
| 2023/0166720 | A1* | 6/2023 | Jones | B60K 6/26 |
| | | | | 701/22 |
| 2023/0347893 | A1* | 11/2023 | Shirai | B60W 30/165 |
| 2023/0373282 | A1* | 11/2023 | Trinchieri | B60L 15/2054 |
| 2023/0382222 | A1* | 11/2023 | Rapp | B60K 17/08 |
| 2024/0190263 | A1* | 6/2024 | Eberl | B60W 50/0098 |

* cited by examiner

POWERTRAIN TORQUE CONTROL DURING SHIFT TO FOUR-WHEEL DRIVE IN AUTOMATED-DRIVING MODE

TECHNICAL FIELD

This disclosure relates to vehicle all-wheel-drive systems and more specifically to shifting for two-wheel drive to four-wheel drive during an automated-driving mode, e.g., cruise control.

BACKGROUND

A motor vehicle includes a powerplant, e.g., an engine, for providing propulsion. Power produced by the engine can be routed to the wheels in a variety of different configurations such as rear-wheel drive, front-wheel drive, four-wheel drive, or all-wheel drive (AWD). Front-wheel drive and rear-wheel drive vehicles include a drive axle that receives powertrain torque and a non-driven axle that is not powered. In contrast, four-wheel-drive and all-wheel-drive are capable of providing power to both axles.

SUMMARY

According to one embodiment, a vehicle includes a primary axle, a secondary axle, and a powertrain. The powertrain has an engine coupled to the primary axle and selectively coupled to the secondary axle. The vehicle also includes a clutch associated with the secondary axle. A controller is programmed to, responsive to (i) a request to shift from two-wheel drive to four-wheel drive and (ii) a current engine-torque command exceeding a torque limit associated with the clutch, override the current engine-torque command to reduce a torque of the engine below the torque limit, and, responsive to the torque of the engine being less the torque limit, command engagement of the clutch.

According to another embodiment, a vehicle includes a primary axle, a secondary axle, a prime mover coupled to the primary axle, a clutch associated with the secondary axle and configured to selectively couple to the secondary axle to the prime mover, and a controller. The controller is programmed to, when the vehicle is in an automated-driving mode: command a first torque to the prime mover based on a user-specified vehicle-speed set point that is set independent of an accelerator pedal position, and, in response to (i) the first torque exceeding a threshold and (ii) a request to engage the clutch, command a second torque to the prime mover that is less the first torque to facilitate engagement of the clutch.

According to yet another embodiment, a method of shifting a vehicle from two-wheel drive to four-wheel drive when cruise control is activated includes overriding a current engine-torque command to reduce a torque of the engine below a torque limit in response to a request to shift from two-wheel drive to four-wheel drive; commanding engagement of a clutch to shift from two-wheel drive to four-wheel drive in response to the torque of the engine being less the torque limit; and discontinuing the override in responsive to the clutch engaging.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
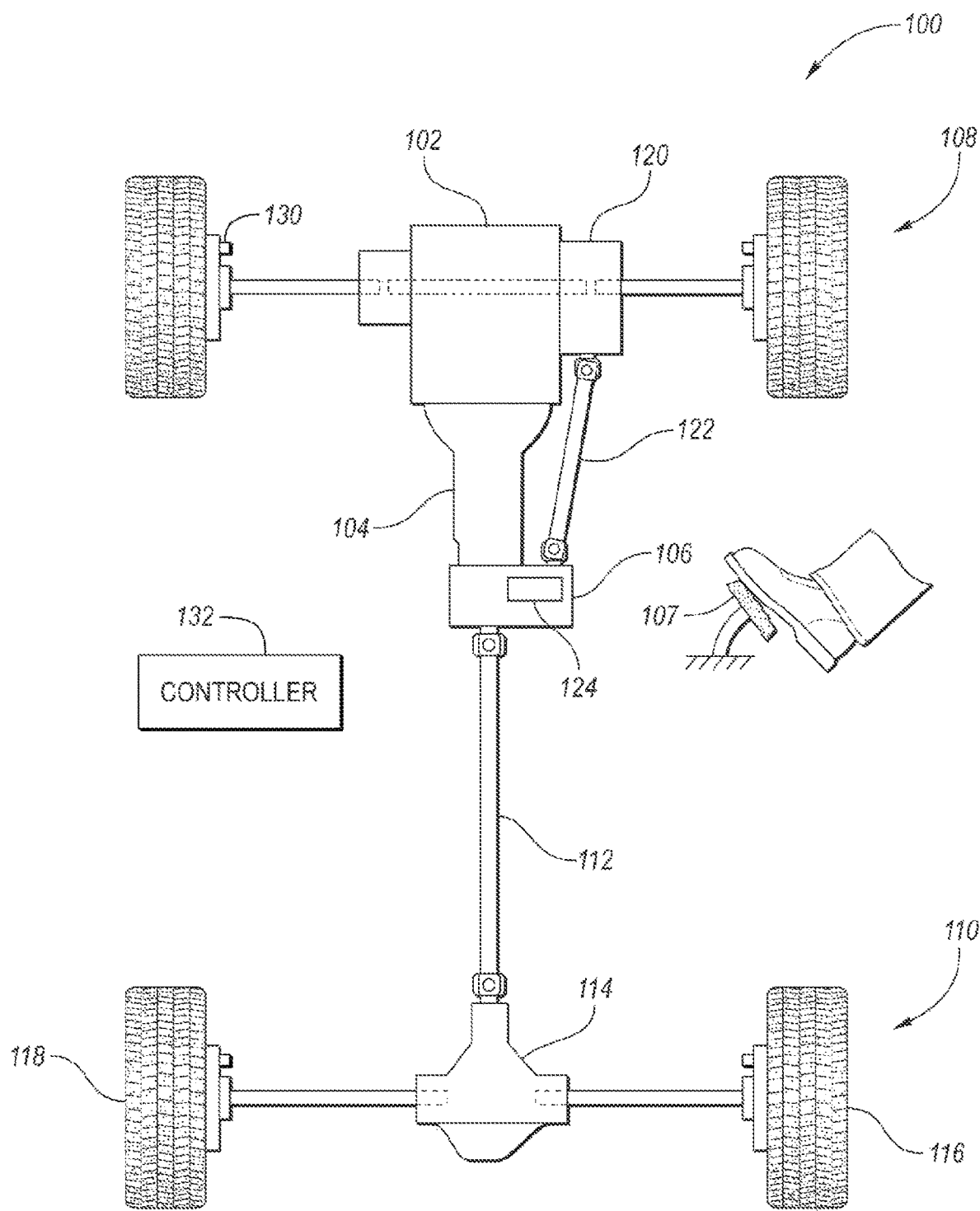
FIG. 1 is a schematic diagram of a vehicle according to one or more embodiments.

FIG. 1 illustrates an all-wheel-drive vehicle 100 having a longitudinally mounted engine 102 (a type of powerplant or prime mover) and is rear-wheel biased. The vehicle 100 may have other types of prime mover or an additional prime mover. An electric motor is another type of the prime mover that may be used in the vehicle 100. A transmission 104 is coupled to the engine 102. The output of the transmission 104 may be connected to a transfer case 106 that selectively powers the secondary axle (front axle) 108. The transfer case 106 is configured to always route power to the primary (rear) axle 110 via a rear driveshaft 112. The driveshaft 112 routes power to a rear differential that splits the power between the left and right rear wheels 116 and 118. The front axle 108 includes a front differential 120 that is driveably connected to the transfer case 106 by a front driveshaft 122. Within the transfer case 106 are one or more clutches 124 that selectively couple the front driveshaft 122 to the prime mover. For example, when the vehicle 100 is in a two-wheel drive, the one or more clutches are disengaged to isolate the front axle 108 and propel the vehicle solely with the rear wheels 116, 118. When the vehicle 100 is in four-wheel drive or all-wheel drive, the one or more clutches 124 are engaged to route at least some of the power produced by the engine 102 to the front axle 108.

The vehicle 100 is switched between two-wheel drive and front-wheel drive by engaging and disengaging the clutch (es) 124. When the clutch 124 is disengaged, power cannot flow from the transmission 104 to the front wheels of the front axle 108; thus, the vehicle is in two-wheel drive. When the clutch(es) 124 is engaged, power flows to the rear axle 110 to propel the vehicle using both the front axle 108 and the rear axle 110, i.e., four-wheel drive.

The vehicle 100 may include wheel sensors 130 such as individual wheel sensors 130 located at each of the wheels. The wheel sensors 130 are configured to output a signal indicative of an angular velocity of their associated wheel. The wheel sensors 130 are in electric communication with a controller 132. The controller 132 is configured to receive the signals from a plurality of vehicle systems and sensor. For example, the controller 132 receives data from the wheel sensors 130 and determines a speed for each of the wheels based on this data. Using the wheel speeds, the controller 132 can determine the relative speeds between each of the wheels, between each of the axles, between wheels of a same axle, the longitudinal speed of the vehicle, and the like to determine conditions (among other things) that are used to control the all-wheel-drive system and other systems of the vehicle. For example, the controller 132 may be programmed to determine the average wheel speed for the front axle 108 based on the speed sensors 130 associated with the front wheels and to determine the average wheel speed for the rear axle 110 based on the speed sensors 130 of the rear wheels. The controller 132 may be further programmed to compare the average wheel speeds of the front and rear axles 108 and 110 to determine the relative wheel slip between these axles.

The controller 132, such as a powertrain control unit (PCU), an engine control module (ECM), and an all-wheel drive controller, while illustrated as one controller may be part of a larger control system and may be controlled by various other controllers throughout the vehicle 100, such as a vehicle system controller (VSC). It should be understood that the controller 132 and one or more other controllers can collectively be referred to as a "controller" that controls various actuators in response to signals from various sensors to control functions such as engine torque commands, scheduling transmission shifts, operating the clutches of the all-wheel drive-system, etc. The controller 132 may include a one or more microprocessors or central processing units (CPU) in communication with various types of computer-readable storage devices or media. Computer-readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling the vehicle.

The controller 132 communicates with various vehicle sensors and actuators via an input/output (I/O) interface that may be implemented as a single integrated interface that provides various raw data or signal conditioning, processing, and/or conversion, short-circuit protection, and the like. Alternatively, one or more dedicated hardware or firmware chips may be used to condition and process particular signals before being supplied to the CPU. As generally illustrated in the representative embodiment of FIG. 1, the controller 132 may communicate signals to and/or from the engine 102, the transmission 104, the transfer case 106, the wheel sensors 130, and others. Although not explicitly illustrated, those of ordinary skill in the art will recognize various functions or components that may be controlled by controller 82 within each of the subsystems identified above. Representative examples of parameters, systems, and/or components that may be directly or indirectly actuated using control logic executed by the controller.

The vehicle 100 includes an accelerator pedal 107 used to set a driver-demanded torque for the engine 102. The accelerator pedal 107 may be electronic, meaning there is no mechanical connection between the pedal 107 and the throttle of the engine. Instead, the pedal 107 includes a sensor that senses a pedal position of the accelerator pedal 107 and outputs a signal (data) to the controller 132 indicating the pedal position. The controller 132 interprets this data and determines a driver-demanded torque based upon one or more lookup tables. The controller 132 then commands the engine to produce the driver-demanded torque.

The controller 132 is configured to estimate the torque produced by the powerplant, e.g., the engine 102. For internal-combustion engines, the controller 132 may determine the torque produced based on the amount of air and fuel entering the engine. The powertrain torque estimate at the wheels may be calculated by measuring the air and fuel being consumed by the engine and accounting for losses from friction, accessories, fluid pumping, and other ancillary power consumers to determine the net torque available at the wheels. The controller 132 may compare the actual torque produced to the commanded torque and make adjustments as necessary to reduce the error.

The clutch 124 may be a dog clutch or other type of intermeshing clutch. This type of clutch requires substantial speed synchronization across its sides in order to smoothly engage and, in some instances, disengage. The clutch 124 may or may not include a speed-synchronizing mechanism, e.g., a synchronizer ring or cone. The clutch 124 does not require perfect speed synchronization in order to smoothly engage. Rather, a reduction in input torque is sufficient to smoothly engage the clutch 124. For example, a driver may release the accelerator pedal 107 to reduce engine torque during a shift from two-wheel drive to four-wheel drive and vice versa. (In some applications, engine torque reduction is not required to shift to two-wheel drive.)

Figure 2A:
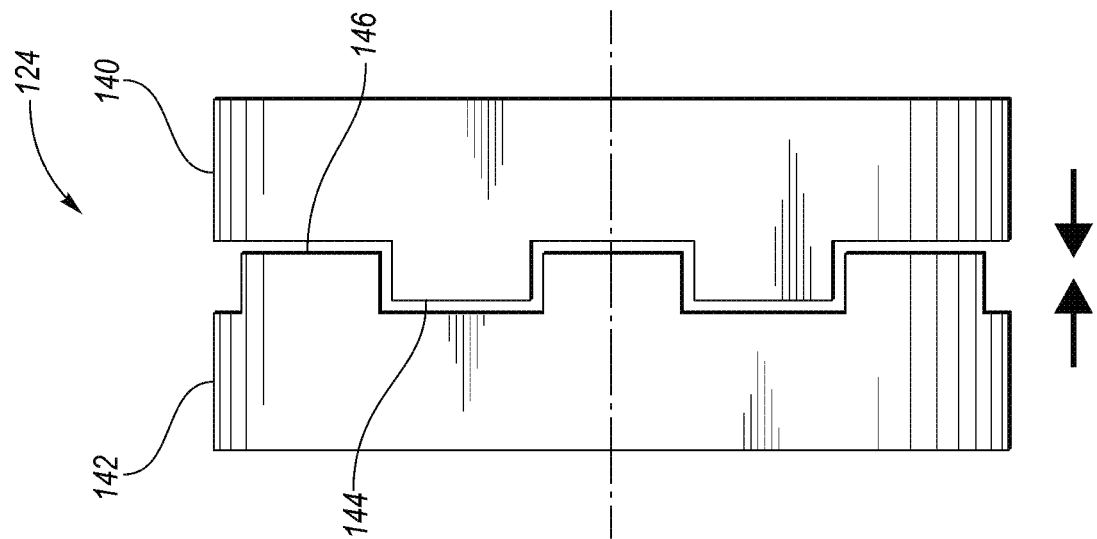
FIG. 2A is a diagrammatical view of an example clutch in a disengaged position.
Figure 2B:
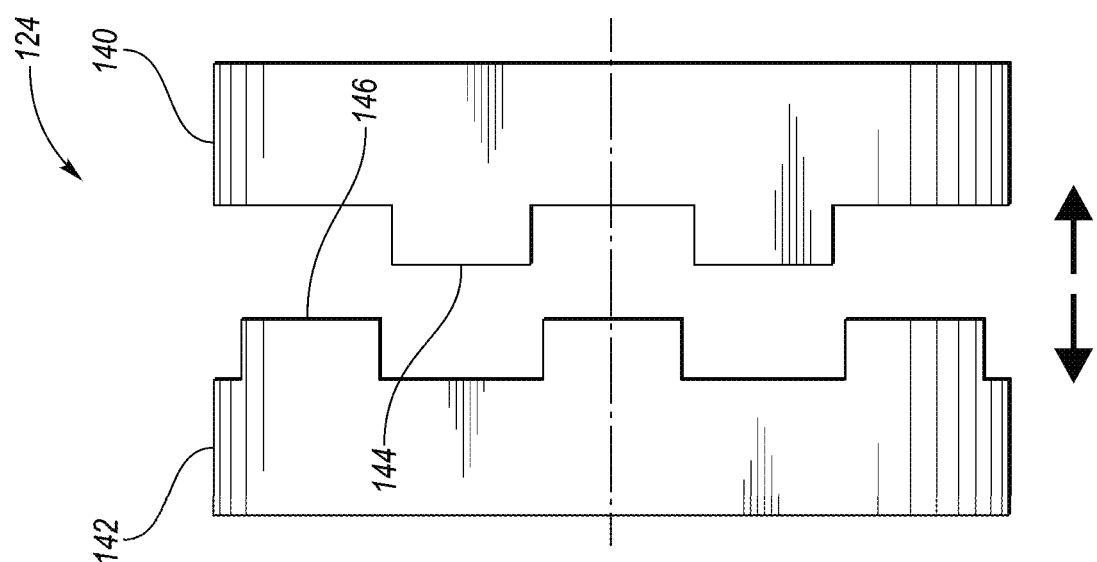
FIG. 2B is a diagrammatical view of the clutch in an engaged position.

Referring to FIGS. 2A and 2B, the clutch 124 may include a first component 140 operably coupled to the prime mover e.g., the engine 102. A second component 142 of the clutch 124 is operably coupled to the secondary axle, e.g., front axle 108. The first component 140 includes engagement features 144 that are configured to mesh with engagement features 146 of the second component 142. The clutch 124 includes a disengaged position shown in FIG. 2A and an engaged position shown in FIG. 2B. In the disengaged position, the first and second components 140 and 142 are spaced apart so that the engagement features 144, 146 are not in contact. Here, the components 140 and 142 can rotate independently of each other. In the context of the transfer case 106, the second component 142 is not driven when the clutch 124 is disengaged. The clutch is engaged by sliding the first component 140 and the second component 142 towards each other so that the engagement features 144 and 146 mesh with each other. In this position, the first and second components 140 and 142 rotate in unison through engagement between the engagement features 144 and 146. The engagement features may be teeth, cogs, splines, or any other feature configured to transfer relative motion between two components. While the illustrated clutch 124 includes engagement features on the faces, the engagement features could also be placed on the circumferential surfaces of the components 140 and 142. For example, the component 140 may include a sleeve portion having a diameter larger than the second component 142, which includes features on its outer diameter that engage with features on the inner diameter of the sleeve.

The vehicle 100 may include one or more automated-driving modes in which the controller controls one or more driving functions autonomously of the driver. For example, the vehicle 100 may include cruise control in which the controller controls throttle inputs (also known as driver-demanded torque) to maintain a set vehicle speed (sometimes referred to as a user-specified vehicle-speed set point). Another automated-driving mode is adaptive cruise control (ACC) in which the controller monitors traffic and controls the speed of the vehicle (via throttle and brake inputs) based on a speed setpoint and sense traffic conditions. Yet another automated-driving mode is autonomous driving in which the controller controls steering, braking, and throttle inputs. The preceding is merely an example list and is not exhaustive of all the different types of automated-driving modes of the vehicle 100. It is to be understood that the term "driver-demanded torque" is not limited to driver input to the accelerator pedal 107 and that the controller 132 may set the driver-demanded torque independently of the driver during an automated-driving mode.

As explained above, the powertrain may benefit from a low torque state when shifting from two-wheel drive to four-wheel drive. When the driver is controlling the throttle inputs, this may be accomplished by the driver releasing the accelerator pedal during the shift. However, when the vehicle controller is controlling the throttle inputs during an automated-driving mode, the controller must reduce the powertrain torque in order to shift from two-wheel drive to four-wheel drive. Some vehicles lack this controller functionality and, as such, are prohibited from shift between two-wheel drive and four-wheel drive while the vehicle is in an automated-driving mode.

As will be explained in more detail below, the vehicle 100 includes control logic allowing the vehicle 100 to be shifted from two-wheel drive to four-wheel drive during an automated-driving mode. For example, the controller may include a driveline-control module that will request a short duration of torque reduction in order to satisfy the conditions required to engage the clutch associated with the secondary axle and then ramp powertrain torque back to the driver-demanded torque following the shift. This allows the vehicle 100 to remain in an automated-driving mode while also shifting from two-wheel drive to four-wheel drive.

Control logic or functions performed by controller 132 may be represented by flow charts or similar diagrams in one or more figures. These figures provide representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but is provided for ease of illustration and description. The control logic may be implemented primarily in software executed by a microprocessor-based vehicle, engine, and/or powertrain controller, such as controller 132. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like.

Figure 3:
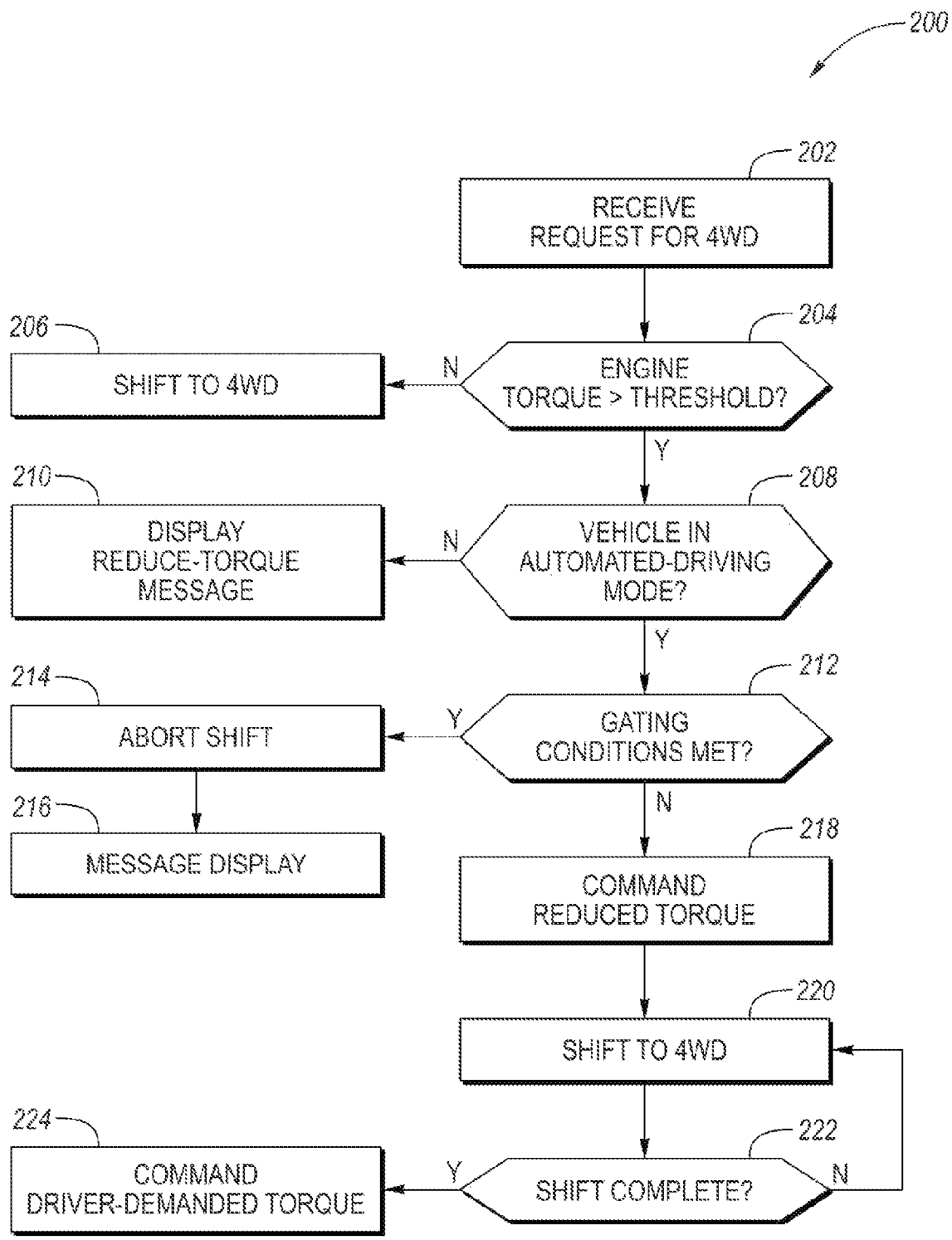
FIG. 3 is a flow chart of an algorithm for shifting a vehicle from two-wheel drive to four-wheel drive.

FIG. 3 is a flowchart 200 of an algorithm 200 for shifting the vehicle from two-wheel drive to four-wheel drive. At operation 202, the controller receives a request for activation of the secondary axle, e.g., a request to shift to four-wheel drive. At operation 204, the controller determines if the engine torque (or powertrain torque) exceeds a threshold or limit. The threshold torque may be based on the properties of the clutch(es) associated with the secondary axle. For example, some types of clutches provide smooth engagement at higher input torques than other clutches and the torque limit or threshold varies accordingly. If the engine torque is less than the threshold, control passes to operation 206 and the powertrain is shifted to four-wheel drive by commanding engagement of the clutch.

If the engine torque exceeds the threshold, control passes to operation 208, where the controller determines if the vehicle is in an automated-driving mode. If no at operation 208, a message is displayed to the driver at operation 210. The message may be displayed on the instrument panel or infotainment display visible to the driver. The message may instruct the driver to reduce engine torque. An example message text may be "to engage four-wheel drive release accelerator pedal." Of course, this disclosure is not limited to any particular message language and any message conveying the concept of reducing engine torque may be provided to the driver.

If the vehicle is in an automated-driving mode, e.g., cruise control, then the controller must autonomously reduce the engine torque during the activation of the secondary axle. At operation 212, the controller determines if gating conditions are met for an automatic torque reduction. Example gating conditions include accelerator-pedal released, road load less than threshold, e.g., towing trailer uphill, driver has not cancelled the automated-driving mode, the driver has not directly overridden the automated-driving mode torque request (i.e., pressing the accelerator pedal to speed up above the cruise control setpoint), the driver has not cancelled the four-wheel-drive request, the automated-driving mode torque request is not above a maximum threshold, and others. The controller may continue to monitor gating conditions while torque is ramping down until the point where the engagement of the clutches is commanded.

If the gating conditions are not met, the torque reduction is aborted at operation 214 and the secondary axle is not activated. A message may then be displayed at operation 216 to indicate to the driver that shifting to four-wheel drive is not possible under current operating conditions. The message may also include instructions for placing the vehicle in condition for four-wheel drive activation.

If the gating conditions are met, control passes to operation 218 and the controller commands a torque reduction. That is, the controller overrides the current driver-demanded torque and commands a lower torque so that the clutch(es) may be smoothly engaged in order to activate the secondary axle. The new torque is less than or equal to the torque threshold of operation 204 and is based on the properties of the clutch. The controller then commands engagement of the clutch(es) to activate the secondary axle, e.g., shift to four-wheel drive, at operation 220. The controller monitors the shift at operation 222 and control passes to operation 224 once the shift is complete. At operation 224, the controller again commands the driver-demanded torque to resume driving as desired by the driver. Rather than abruptly commanding the driver-demanded torque at operation 224 post shift, the vehicle may ramp up the torque from the torque reduction of operation 218 to the driver-demanded torque in order to provide smooth powertrain performance.

In the above-described examples, the clutch(es) were located within a transfer case. Other vehicles contemplated by this disclosure may include wheel-end disconnect clutches that are used to connect the wheels of a secondary axle to the powertrain. An example wheel end disconnect clutch is described in Applicant's co-pending application Ser. No. 17/116,283 filed on Dec. 9, 2020, the contents of which are hereby incorporated by reference herein in their entirety. The wheel-end disconnect clutches may also be dog clutches that may require low torque for smooth engagement. The above-described control strategy may be utilized for reducing torque in order to engage the wheel-end disconnect clutches similar to that described above with the clutch 124. It is to be understood that this disclosure is not limited to any particular type of clutch and may be used with any hardware that requires a powertrain torque reduction during clutch engagement.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to strength, durability, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle comprising:
a primary axle;
a secondary axle;
a powertrain including an engine coupled to the primary axle and selectively coupled to the secondary axle;
a clutch associated with the secondary axle; and
a controller programmed to, responsive to (i) a request to shift from two-wheel drive to four-wheel drive and (ii) a current engine-torque command exceeding a torque limit associated with the clutch:
override the current engine-torque command to reduce a torque of the engine below the torque limit, and
responsive to the torque of the engine being less the torque limit, command engagement of the clutch.

2. The vehicle of claim 1, wherein the controller is further programmed to, responsive to the clutch engaging, discontinue the override.

3. The vehicle of claim 1, wherein the controller is further programmed to, responsive to the clutch engaging, command torque to the engine based on a vehicle-speed set point.

4. The vehicle of claim 3, wherein the vehicle-speed set point is associated with cruise control.

5. The vehicle of claim 1, wherein the clutch includes a first component having a first engagement feature and a second component having a second engagement feature configured to engage with the first engagement feature to engage the clutch, wherein the first and second components are arranged to rotate independently when the first and second engagement features are disengaged and are arranged to rotate in unison when the first and second engagement features are fully engaged.

6. The vehicle of claim 5, wherein the powertrain further includes a transfer case housing the clutch.

7. The vehicle of claim 5, wherein the clutch is a dog clutch.

8. The vehicle of claim 1, wherein the primary axle is a front axle, and the secondary axle is a rear axle.

9. A vehicle comprising:
a primary axle;
a secondary axle;
a prime mover coupled to the primary axle;
a clutch associated with the secondary axle and configured to selectively couple to the secondary axle to the prime mover; and
a controller programmed to, when the vehicle is in an automated-driving mode:
command a first torque to the prime mover based on a user-specified vehicle-speed set point that is set independent of an accelerator pedal position, and
in response to (i) the first torque exceeding a threshold and (ii) a request to engage the clutch, command a second torque to the prime mover that is less the first torque to facilitate engagement of the clutch.

10. The vehicle of claim 9, wherein the controller is further programmed to, in response to the clutch engaging, command the first torque.

11. The vehicle of claim 9, wherein the user-specified vehicle-speed set point is associated with cruise control.

12. The vehicle of claim 9, wherein the automated-driving mode is cruise control.

13. The vehicle of claim 12, wherein the user-specified vehicle-speed set point is associated with the cruise control.

14. The vehicle of claim 9, wherein the automated-driving mode is adaptive cruise control.

15. The vehicle of claim 9, wherein the automated-driving mode is an autonomous driving mode.

16. The vehicle of claim 9, wherein the prime mover is an engine.

17. The vehicle of claim 9, wherein the clutch includes a first component having a first engagement feature and a second component having a second engagement feature configured to engage with the first engagement feature to engage the clutch, wherein the first and second components are arranged to rotate independently when the first and second engagement features are disengaged and are arranged to rotate in unison when the first and second engagement features are fully engaged.

18. The vehicle of claim 9, wherein the clutch is a dog clutch.

19. A method of shifting a vehicle from two-wheel drive to four-wheel drive when cruise control is activated, the method comprising:
overriding a current engine-torque command to reduce a torque of the engine below a torque limit in response to a request to shift from two-wheel drive to four-wheel drive;

commanding engagement of a clutch to shift from two-wheel drive to four-wheel drive in response to the torque of the engine being less the torque limit; and
discontinuing the override in responsive to the clutch engaging.

20. The method of claim 19, wherein the clutch is a dog clutch.

\* \* \* \* \*